United States Patent
Shi et al.

(10) Patent No.: US 10,979,999 B2
(45) Date of Patent: Apr. 13, 2021

(54) INFORMATION TRANSMISSION METHOD, EQUIPMENT AND COMPUTER-READABLE STORAGE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Jia Shen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 17 days.

(21) Appl. No.: 16/513,182

(22) Filed: Jul. 16, 2019

(65) Prior Publication Data

US 2020/0015277 A1    Jan. 9, 2020

Related U.S. Application Data

(63) Continuation of application No. PCT/CN2018/071976, filed on Jan. 9, 2018.

(Continued)

(51) Int. Cl.
*H04W 68/02* (2009.01)
*H04W 72/04* (2009.01)
(Continued)

(52) U.S. Cl.
CPC ....... *H04W 68/025* (2013.01); *H04W 72/042* (2013.01); *H04W 72/1289* (2013.01); *H04W 72/10* (2013.01)

(58) Field of Classification Search
CPC ............... H04W 68/025; H04W 72/10; H04W 72/1289; H04W 72/042
See application file for complete search history.

(56) References Cited

U.S. PATENT DOCUMENTS

2007/0135142 A1*  6/2007  Butler ................... H04L 1/0025
                                                       455/458
2018/0027576 A1*  1/2018  Kowalski .......... H04W 72/0446
                                                       370/329

(Continued)

FOREIGN PATENT DOCUMENTS

CN            1568089 A     1/2005
CN          102932926 A     2/2013
(Continued)

OTHER PUBLICATIONS

The First Office Action of corresponding Chinese application No. 201880004974.3, dated Jun. 24, 2020.

(Continued)

*Primary Examiner* — Min Jung
(74) *Attorney, Agent, or Firm* — Ladas & Parry LLP

(57) ABSTRACT

An information transmission method, equipment and a computer-readable storage medium are provided. The method includes that: the base station sends indication information on a first channel for performing a first service, wherein the indication information comprises at least one of information associated with a second channel or a timing instance at which a terminal monitors the second channel, the second channel being used for performing a second service, and sends configuration information for the terminal on the second channel. The method can avoid the high power consumption caused by the continuous monitoring of the terminal and reduce the impacts on performance of the other terminals.

16 Claims, 7 Drawing Sheets

Related U.S. Application Data

(60) Provisional application No. 62/448,554, filed on Jan. 20, 2017.

(51) Int. Cl.
*H04W 72/12* (2009.01)
*H04W 72/10* (2009.01)

(56) References Cited

U.S. PATENT DOCUMENTS

| | | | |
|---|---|---|---|
| 2018/0115966 A1* | 4/2018 | Chen | H04W 68/02 |
| 2018/0167164 A1* | 6/2018 | Lin | H04L 1/00 |
| 2019/0165906 A1* | 5/2019 | Bala | H04L 5/0007 |
| 2019/0254058 A1* | 8/2019 | Xie | H04L 5/0064 |
| 2019/0327663 A1* | 10/2019 | Wirth | H04W 88/10 |
| 2019/0342043 A1* | 11/2019 | Fan | H04L 1/16 |
| 2019/0349960 A1* | 11/2019 | Li | H04W 72/1242 |

FOREIGN PATENT DOCUMENTS

| | | |
|---|---|---|
| WO | 2016161649 A1 | 10/2016 |
| WO | 2016192644 A1 | 12/2016 |

OTHER PUBLICATIONS

Guangdong OPPO Mobile Telecom, 3GPP TSG RAN WG1 NR AdHoc, On multiplexing eMBB and URLLC in DL, published on Jan. 9, 2017.

NEC, 3GPP TSG RAN WG1 Meeting NR Adhoc, DCI monitoring configuration for mini-slot, published on Jan. 9, 2017.

Institute for Information Industry (III), 3GPP TSG-RAN WG1 NR-Adhoc, Discussion on eMBB and URLLC multiplexing in UL, published on Jan. 6, 2017.

Extended European Search Report dated Nov. 25, 2019 for Appln. No. EP 18741342.2.

Sumsung: "Summary of e-mail discussions on muitipiexing eMBB and URLLC in DL", R1-1700972 (3GPP); Mobile Competence Centre; 650, Route Des Lucioles; F-0692, vol. RAN WG1, No. Spokane, USA; Jan. 16, 2017-Jan. 20, 2017; Jan. 10, 2017; XP051203264.

Interdigital Communications: "Preemption/superposition-based multiplexing of eMBB and URLLC", R1-1700721 (3GPP); Mobile Competence Centre; 650, Route Des Lucioles; F-06921 Sophia-Ant; vol. RAN WG1, No. Spokane, USA; Jan. 16, 2017-Jan. 20, 2017: Jan. 10, 2017; XP051203040.

Sequans Communications: "On dynamic resource sharing between URLLC and eMBB in DL" R1-1700642 (3GPP); Mobile Competence Centre; 650, Route Des Lucioles; F1-06921 Sophia-Antipolis; vol. RAN WG1, No. Spokane, USA; Jan. 16, 2017-Jan. 20, 2017.

International Search Report dated Mar. 27, 2018 for Application No. PCT/CN2018/071976.

The Second Office Action of corresponding Chinese application No. 201880004974.3, dated Sep. 17, 2019.

The first Office Action of corresponding European application No. 18741342.2, dated Nov. 19, 2020.

English translation of the second Office Action of corresponding Chinese application No. 201880004974.3, dated Sep. 17, 2019.

\* cited by examiner

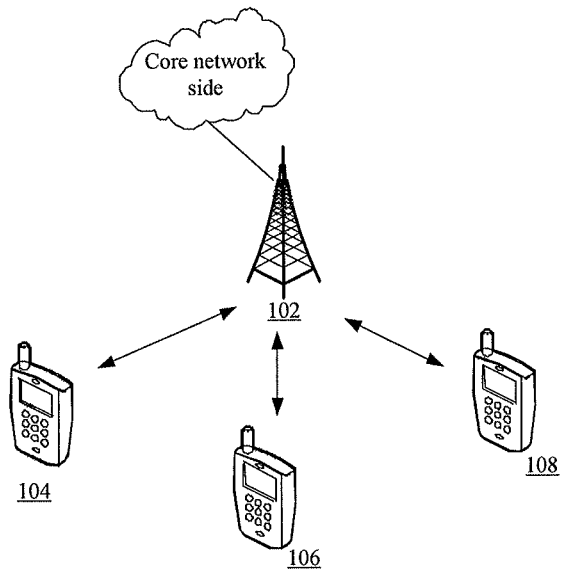

FIG. 1

| the base station sends indication information on a first channel for performing a first service, the indication information comprising at least one of information associated with a second channel or a timing instance at which a terminal monitors the second channel, the second channel being used for performing a second service | — S201 |

| the base station sends configuration information for the terminal on the second channel | — S202 |

FIG. 2

| the terminal receives indication information sent by a base station on a first channel, the indication information comprising at least one of information associated with a second channel or a timing instance at which a terminal monitors the second channel, the first channel being used for performing a first service and the second channel being used for performing a second service | — S301 |

| the terminal monitors the second channel and detects configuration information sent by the base station on the second channel | — S302 |

FIG. 3

INFORMATION TRANSMISSION METHOD, EQUIPMENT AND COMPUTER-READABLE STORAGE MEDIUM

CROSS-REFERENCE TO RELATED APPLICATIONS

This application is a continuation of International Application No. PCT/CN2018/071976, filed on Jan. 9, 2018, which claims priority to American Provisional Application No. 62448554, entitled "A Transmission Scheme of URLLC Reconfiguration Information", filed on Jan. 20, 2017, the entire contents of which are incorporated herein by reference.

TECHNICAL FIELD

Embodiments of the disclosure relate to the field of wireless communications, and more particularly to an information transmission method, equipment and a computer-readable storage medium.

BACKGROUND

With the development of communication technology, researches on the 5th generation mobile communication technology (5G, 5th Generation) have been performed. The wireless access in the 5G system is called New Radio, referred to as NR. In the 5G system, there are three typical application scenarios: Enhanced Mobile Broadband (eMBB), Ultra Reliable and Low Latency Communication (URLLC), massive Machine Type of Communication (mMTC). In the eMBB scenario, the user experience and other performances are further improved by significantly raising the data transmission speed on the basis of the existing mobile broadband services. The URLLC scenario is applied for extremely delay-sensitive service applications, including automatic or assisted driving, AR (Augmented Reality), VR (Virtual Reality), Tactile Internet, and Industrial Controls. If the network delay is high, the URLLC services cannot be operated normally and occur errors in control.

In the 5G system, for a UE in the active state of the URLLC service (i.e., the UE is monitoring to receive URLLC data), when the base station sends the configuration/reconfiguration information to the UE, if the configuration/reconfiguration information is carried in a resource other than the URLLC resource, for example, an eMBB resource, the UE needs to always monitor the information in eMBB resources to timely obtain the configuration information. However, the continuous monitoring on the resources has high complexity and high power consumption. For example, due to the long duration for monitoring control channels on the eMBB resources, the continuous monitoring on the eMBB resources results in high power consumption. In view of the above problem, another method for sending configuration/reconfiguration information is proposed, that is, the configuration/reconfiguration information is carried in the URLLC resource for sending. In this case, the UE needs to always receive the information in the URLLC resource to timely obtain the sent configuration information. It should be noted that, according to the low latency requirement of the URLLC resource, the UE has to receive the information of the URLLC service preferentially; and if the UE has no sufficient resources for performing URLLC service, the UE may occupy the resources of the non-URLLC service of other UEs, for example, the resources for performing the eMBB service, thereby resulting in the performance degradation of other UEs.

SUMMARY

To address part or all the problems, the embodiments of the disclosure provide an information transmission method, equipment and computer readable media, which may avoid the high power consumption caused by the continuous monitoring of the terminal and reduce the impacts on performance of the other terminals.

A first aspect provides an information transmission method, which may include that: a base station sends indication information on a first channel for performing a first service, the indication information comprising at least one of information associated with a second channel or a timing instance at which a terminal monitors the second channel, the second channel being used for performing a second service; and the base station sends configuration information for the terminal on the second channel.

A second aspect provides an information transmission method, which may include that: a terminal receives indication information sent by a base station on a first channel, the indication information comprising at least one of information associated with a second channel or a timing instance at which a terminal monitors the second channel, the first channel being used for performing a first service and the second channel being used for performing a second service; and the terminal monitors the second channel and detects configuration information sent by the base station on the second channel according to the indication information.

A third aspect provides network-side equipment, which may include a first sending module and a second sending module, wherein the first sending module is configured to send indication information on a first channel for performing a first service, the indication information comprising at least one of information associated with a second channel or a timing instance at which a terminal monitors the second channel, the second channel being used for performing a second service; and the second sending module is configured to send configuration information for the terminal on the second channel.

A fourth aspect provides a terminal, which may include a receiving module and a detecting module, wherein the receiving module is configured to receive indication information sent by a base station on a first channel, the indication information comprising at least one of information associated with a second channel or a timing instance at which a terminal monitors the second channel, the first channel being used for performing a first service, and the second channel being used for performing a second service; and the detecting module is configured to monitor the second channel and detect configuration information sent by the base station on the second channel according to the indication information.

A fifth aspect provides a computer-readable storage medium having stored thereon instructions that, when executed by a processor, cause the processor to execute the operations of the method according to the first aspect.

A sixth aspect provides a computer-readable storage medium having stored thereon instructions that, when executed by a processor, cause the processor to execute the operations of the method according to the second aspect.

A seventh aspect provides network-side equipment, which may include a first network interface, a first memory and a first processor, wherein the first network interface is configured to receive and send signals during a process of sending and receiving information with other external network elements, the first memory is configured to store computer programs running on the first processor, and the first processor is configured to execute the operations of the method according to the first aspect when executing the computer programs.

An eighth aspect provides a terminal, which may include a second network interface, a second memory and a second processor, wherein the second network interface is configured to receive and send signals during a process of sending and receiving information with other external network elements, the second memory is configured to store computer programs running on the second processor, and the second processor is configured to execute the operations of the method according to the second aspect.

A ninth aspect provides an information transmission system, which may include network-side equipment and a terminal, wherein the network-side equipment is configured to send indication information on a first channel for performing a first service, the indication information comprising at least one of information associated with a second channel or a timing instance at which a terminal monitors the second channel, the second channel being used for performing a second service, and send configuration information for the terminal on the second channel; and the terminal is configured to receive indication information sent by the network-side equipment on the first channel, monitor the second channel and detect configuration information sent by the network-side equipment on the second channel according to the indication information.

The embodiments of the disclosure provide an information transmission method, equipment and a computer readable medium. The network-side equipment may send the indication information on the first channel for performing a first service, such that the terminal may monitor the second channel and detect the information carried on the second channel according to the information provided by the indication information, thereby avoiding the high power consumption caused by the continuous monitoring of the terminal and reducing the impacts on performance of the other terminals.

BRIEF DESCRIPTION OF DRAWINGS

FIG. 1 is a schematic structure diagram of a communication system according to an embodiment of the disclosure.

FIG. 2 is a schematic flowchart of an information transmission method according to an embodiment of the disclosure.

FIG. 3 is a schematic flowchart of an information transmission method according to another embodiment of the disclosure.

DETAILED DESCRIPTION

Figure 4:
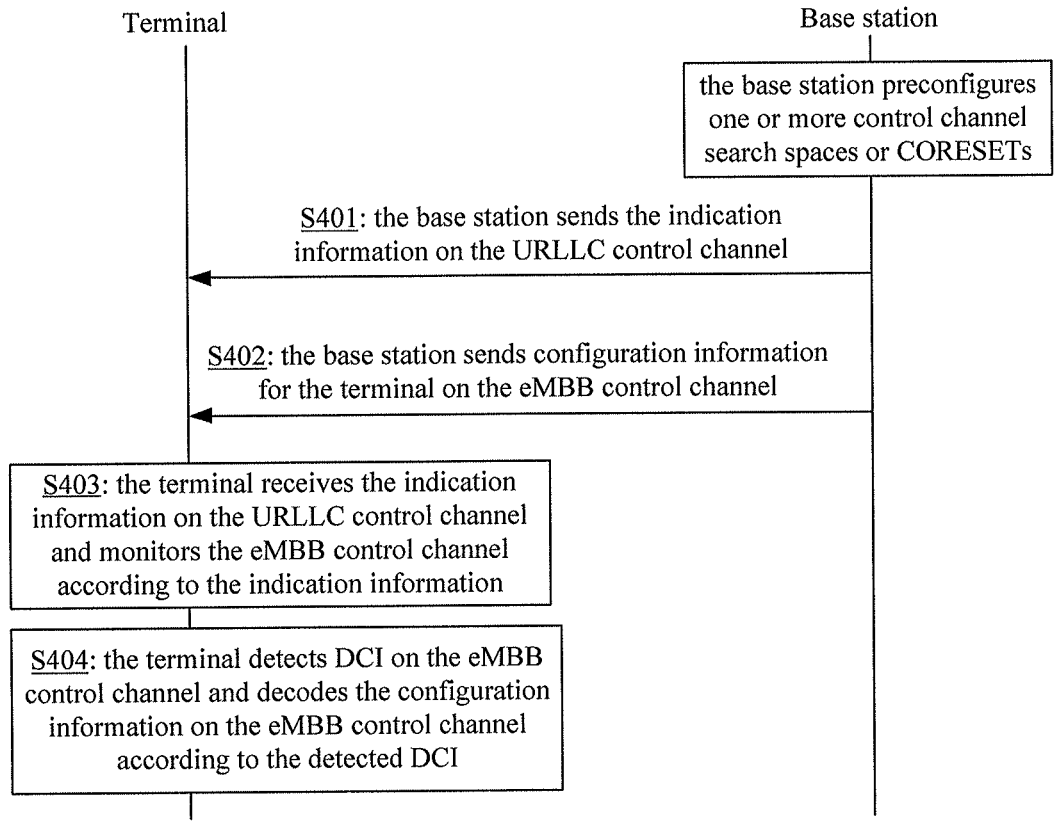
FIG. 4 is a schematic flowchart of a first example according to an embodiment of the disclosure.

The technical solutions in the embodiments of the disclosure will be clearly and completely described below in combination with the drawings in the embodiments of the disclosure.

The technical solutions in the embodiments of the disclosure may be applied for various communication systems, such as, a Global System of Mobile Communication (GSM), a Code Division Multiple Access (CDMA) system, a Wideband Code Division Multiple Access (WCDMA) system, a General Packet Radio Service (GPRS) system, an Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a future 5G communication system and the like.

A terminal of each embodiment in the disclosure may communicate with one or more core networks through a Radio Access Network (RAN). The terminal may refer to User Equipment (UE), an access terminal, a user unit, a subscriber station, a mobile radio station, a mobile station, a remote station, a remote terminal, mobile equipment, a user terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, terminal equipment in a future 5G network and the like.

Network-side equipment of each embodiment in the disclosure may be equipment configured to communicate with the terminal equipment, and for example, may be a Base Transceiver Station (BTS) in a GSM or CDMA, may also be a NodeB (NB) in a WCDMA system, and may further be an Evolutional Node B (eNB or eNodeB) in an LTE system. Or, the base station may be a relay station, an access point, vehicle-mounted equipment, wearable equipment, network-side equipment in the future 5G network and the like.

FIG. 1 is an exemplary and simplified communication system structure. The system illustrated in FIG. 1 is merely a system example that may be applied to the embodiment of the present disclosure, and according to the requirements, the technical solutions of the embodiments of the present disclosure may be implemented in any one of the above communication systems. As illustrated in FIG. 1, the wireless system may include a core network side, a base station, and user equipment (UE). The base station 102 may communicate with one or more UEs 104, 106, 108 via transmission media and provide UEs 104, 106, 108 with access points to the core network side. In the LTE system, the base station 102 may be an Evolved Node B (eNB), and in the 5G NR, the base station 102 may be a gNB. Examples of the UEs 104, 106, 108 may include a cellular phone, a laptop computer, a personal digital assistant (PDA), or any other device with similar functionality.

Embodiment 1

FIG. 2 illustrates an information transmission method according to an embodiment of the disclosure. The method may be applied in the network-side equipment of the communication system, such as, a gNB in the 5G NR, and include the following operations.

In S201, the base station sends indication information on a first channel for performing a first service, the indication information comprising at least one of information associated with a second channel or a timing instance at which a terminal monitors the second channel, the second channel being used for performing a second service.

It should be understood that the timing instance in the indication information may be a specific time at which the terminal starts to monitor the second channel, or a time window during which the terminal monitors the second channel, which is not limited in the embodiments of the disclosure.

In this operation, the first channel comprises a data channel or a control channel for the first service, the second channel comprises a data channel or a control channel for the second service, and the first service has a higher priority than the second service. In an example, the first service may comprise URLLC service, and the second service may comprise other service other than the URLLC service, such as the eMBB service. Correspondingly, the first channel may be a data channel or a control channel carrying the URLLC service, and the second channel may be a data channel or a control channel carrying the eMBB service.

In an example, the information associated with the second channel comprises at least one of one or more control channel search spaces or Control Resource Sets (CORESETs) corresponding to the second channel, time-domain resources of the second channel, or frequency-domain resources of the second channel. The CORESET is specified in the 5G NR technology.

In an example, the indication information may be carried along with service data of the first service on the first channel by multiplexing the indication information with the service data. In an alternative example, the indication information is carried along with service data of the first service on the first channel by puncturing a portion of the service data. Specifically, a portion of the service data of the first service is punctured, and the indication information may occupy the resources of the punctured service data, such that the indication information is carried along with service data of the first service on the first channel. In another example, the base station may send the indication information and the service data of the first service separately on the first channel, i.e., indicating that the information is not multiplexed with the service data of the first service.

In S202, the base station sends configuration information for the terminal on the second channel.

The configuration information may be carried in a Radio Resource Control (RRC) signaling or a Media Access Control (MAC) signaling, for controlling, including but not limited to, data transmission of the terminal, measurement control and reporting, handover, cell selection and reselection, Hybrid Automatic Repeat Request (HARQ) and the like. It should be understood that in addition to the configuration information, the above transmission method can be applied for transmitting other information/messages.

In the embodiment of the disclosure, the base station sends the above indication information, such that the terminal may detect the second channel according to the information associated with the second channel or the timing instance in the indication information, thereby avoiding the high power consumption caused by the continuous monitoring of the terminal and reducing the impacts on performance of the other terminals.

In an implementation for the technical solution illustrated in FIG. 2, the base station may preconfigure or predetermine one or more control channel search spaces or CORESETs. In this case, after receiving the indication information from the base station, the terminal may detect the second channel from the preconfigured control channel search spaces or CORESETs. Specifically, the terminal may detect the second channel from the preconfigured control channel search spaces according to the information associated with the second channel contained in the indication information, such as the time-domain resources of the second channel. It should be noted that the control channel search spaces or CORESETs may be configured before or after the indication information is sent.

In an alternative implementation for the technical solution illustrated in FIG. 2, the indication information may further comprise information for sending the configuration information. The information for sending the configuration information may comprise at least one of the following: time-domain resources used for sending the configuration information, frequency-domain resources used for sending the configuration information, modulation manner used for sending the configuration information, or channel coding manner used for sending the configuration information. In this case, the base station may send the indication information containing the above information, such that the terminal may obtain the second channel information based on at least one of time-domain resources, frequency-domain resources, modulation manner, channel coding manner used for sending the configuration information in the indication information, or detect the second channel from the control channel search spaces or CORESETs corresponding to the second channel in the indication information, and then detect the configuration information on the second channel.

In the embodiment of the disclosure, the first channel may be a channel carrying the URLLC service (i.e., an URLLC channel), and the second channel may be a channel carrying the eMBB service (i.e., an eMBB channel). Specially, the solution may be implemented as follows. The base station may send the indication information on the URLLC channel (or URLLC resources), the indication information comprising information associated with an eMBB channel (or eMBB resources) and/or a timing instance at which a terminal monitors the eMBB channel, and then send configuration information for the terminal on the eMBB channel. After receiving the indication information from the base station, according to information provided by the indication information, the terminal may monitor the eMBB channel and detect the configuration information carried in the eMBB channel. The indication information may or may not be multiplexed with URLLC data. If the indication information is not multiplexed with URLLC data, the indication information is merely transmitted in URLLC resources together with URLLC data. Obviously, the solution can avoid the high power consumption caused by the continuous monitoring of the terminal; and further through sending the configuration information on the eMBB resources with a lower latency requirement, the solution can prevent the current terminal from preempting the resources of the other terminals and thus reduce the impacts on performance of the other terminals.

According to the information transmission method of the embodiment of the disclosure, the network-side equipment, such as gNB, may send the indication information on the first channel, such that the terminal may detect the second channel according to the information provided by the indication information, thereby avoiding the high power consumption caused by the continuous monitoring of the terminal and reducing the impacts on performance of the other terminals.

Embodiment 2

Based on the same inventive concept as the previous embodiment, FIG. 3 illustrates an information transmission method according to an embodiment of the present disclosure. The method may be applied in to a terminal in the communication system and include the following operations.

In S301, the terminal receives indication information sent by a base station on a first channel, the indication information comprising at least one of information associated with a second channel or a timing instance at which a terminal monitors the second channel, the first channel being used for performing a first service and the second channel being used for performing a second service.

It should be understood that the timing instance in the indication information may be a specific time at which the terminal starts to monitor the second channel, or a time window during which the terminal monitors the second channel, which is not limited in the embodiments of the disclosure.

In this operation, the first channel comprises a data channel or a control channel for the first service, the second channel comprises a data channel or a control channel for the second service, and the first service has a higher priority than the second service. In an example, the first service may comprise URLLC service, and the second service may comprise other service other than the URLLC service, such as the eMBB service. Correspondingly, the first channel may be a data channel or a control channel carrying the URLLC service, and the second channel may be a data channel or a control channel carrying the eMBB service.

In an example, the information associated with the second channel comprises at least one of one or more control channel search spaces or CORESETs corresponding to the second channel, time-domain resources of the second channel, or frequency-domain resources of the second channel.

In an example, the indication information may be carried along with service data of the first service on the first channel by multiplexing the indication information with the service data. In an alternative example, the indication information is carried along with service data of the first service on the first channel by puncturing a portion of the service data. Specifically, a portion of the service data of the first service is punctured, and the indication information may occupy the resources of the punctured service data, such that the indication information is carried along with service data of the first service on the first channel. In another example, the indication information and the service data of the first service are separately received on the first channel, i.e., indicating that the information is not multiplexed with the service data of the first service.

In S302, the terminal monitors the second channel and detects configuration information sent by the base station on the second channel according to the indication information.

The configuration information may be carried in a RRC signaling or a MAC signaling, for controlling, including but not limited to, data transmission of the terminal, measurement control and reporting, handover, cell selection and reselection, HARQ and the like. It should be understood that in addition to the configuration information, the above transmission method can be applied for transmitting other information/messages.

In the embodiment of the disclosure, after receiving the above indication information, the terminal may detect the second channel according to the information associated with the second channel or the timing instance in the indication information, and monitor the second channel according to the timing instance, thereby avoiding the high power consumption caused by the continuous monitoring of the terminal and reducing the impacts on performance of the other terminals.

In a first implementation for the technical solution illustrated in FIG. 3, after receiving the indication information, the terminal may detect the second channel from one or more control channel search spaces or CORESETs preconfigured by the base station, detect downlink control information (DCI) carried in the second channel according to the timing instance, and decode the configuration information according to the detected DCI.

Specifically, the base station may preconfigure or predetermine one or more control channel search spaces or CORESETs. When the terminal receives the indication information, the terminal may detect the second channel from the preconfigured control channel search spaces or CORESETs based on the information associated with the second channel, such as the time-domain resources or the frequency-domain resources of the second channel in the indication information. When the second channel is detected, the terminal may obtain the DCI carried in the second channel, and decode the configuration information according to the detected DCI. The decoding operation uses the existing decoding technology, which will not be elaborated herein. In an alternative embodiment, the terminal may preset a time period. If no second channel carrying the configuration information is detected from the channel search spaces within the time period, it indicates that the base station has not sent the configuration information, and the process ends.

In a second implementation for the technical solution illustrated in FIG. 3, the indication information may further comprise information for sending the configuration information. The information for sending the configuration information may comprise at least one of the following: time-domain resources used for sending the configuration information, frequency-domain resources used for sending the configuration information, modulation manner used for sending the configuration information, or channel coding manner used for sending the configuration information. In this case, after receiving the indication information, the terminal may monitor the second channel and detect the configuration information on the second channel by virtue of the specific information content contained in the indication information.

The implementations in S302 are different as the different contents of the indication information. Specifically, there may be two implementations as follows.

Implementation 1

When the indication information further comprises information for sending the configuration information, i.e., at least one of time-domain resources, frequency-domain resources, modulation manner or channel coding manner used for sending the configuration information, after receiving the indication information, the terminal may detect the second channel according to at least one of time-domain resources, frequency-domain resources, modulation manner or channel coding manner used for sending the configuration information in the indication information and decode the configuration information carried in the second channel. For example, when the indication information comprises time-domain resources used for sending the configuration information, the terminal may obtain the second channel information according to the time-domain resources, and then detect the configuration information on the second channel.

It should be noted that in the above implementation 1 of the embodiment of the disclosure, there is no need to detect the DCI of the second channel, and the configuration information may be decoded merely according to the indication information.

Implementation 2

When the indication information comprises one or more control channel search spaces or CORESETs corresponding to the second channel, after receiving the indication information, the terminal may detect the second channel from the control channel search spaces or CORESETs corresponding to the second channel in the indication information, detect the DCI carried in the second channel according to the timing instance, and decode the configuration information according to the indication information and the detected DCI.

It should be noted that in the above implementation 2 of the embodiment of the disclosure, the control channel search spaces corresponding to the second channel is obtained from the indication information, and the DCI carried in the second channel needs to be detected. The configuration information may be decoded based on the indication information in combination with the detected DCI.

In the embodiment of the disclosure, the first channel may be a channel carrying the URLLC service (i.e., an URLLC channel), and the second channel may be a channel carrying the eMBB service (i.e., an eMBB channel). Specially, the solution may be implemented as follows. The terminal may receive the indication information on the URLLC channel (or URLLC resources), the indication information comprising information associated with an eMBB channel (or eMBB resources) and/or a timing instance at which a terminal monitors the eMBB channel, detect the eMBB channel according to information provided by the indication information and obtain the configuration information on the eMBB channel. The indication information may or may not be multiplexed with URLLC data. If the indication information is not multiplexed with URLLC data, the indication information is merely transmitted in URLLC resources together with URLLC data. Obviously, the solution can avoid the high power consumption caused by the continuous monitoring of the terminal; and further through sending the configuration information on the eMBB resources with a lower latency requirement, the solution can prevent the current terminal from preempting the resources of the other terminals and thus reduce the impacts on performance of the other terminals.

According to the information transmission method of the embodiment of the disclosure, the terminal may obtain the second channel information and detect the second channel according to the indication information sent on the first channel by the base station, thereby avoiding the high power consumption caused by the continuous monitoring of the terminal and reducing the impacts on performance of the other terminals.

Embodiment 3

The technical solutions of the above embodiments are described in detail below with reference to specific examples.

Example 1

In this example, the base station will send configuration/reconfiguration information to the UE in the active state of the URLLC service, i.e., the UE is monitoring to receive URLLC data. In the scenario of this example, the first channel may be a control channel carrying the URLLC service, the second channel may be a control channel carrying the eMBB service, and the base station may pre-configure one or more control channel search spaces or CORESETs. It should be noted that the above scenario is only meant to illustrate the disclosure and not to restrict it in any way. Referring to FIG. 4, the flowchart of the example is illustrated as follows.

In S401, the base station sends the indication information on the URLLC control channel.

The indication information comprises information associated with an eMBB control channel and a timing instance at which a terminal monitors the eMBB control channel, wherein the timing instance in the indication information may be a specific time at which the terminal starts to monitor the second channel, or a time window during which the terminal monitors the second channel. The eMBB control channel may or may not have a mapping with the URLLC control channel, which is not limited in the embodiments of the disclosure.

The information associated with the eMBB control channel comprises at least one of one or more control channel search spaces or CORESETs corresponding to the eMBB control channel, time-domain resources of the eMBB control channel, or frequency-domain resources of the eMBB control channel.

In an implementation of this operation, the indication information may be carried along with URLLC data on the URLLC control channel by multiplexing the indication information with the URLLC data. In an alternative implementation, the indication information is carried along with URLLC data on the URLLC control channel by puncturing a portion of the URLLC data. Specifically, a portion of the URLLC data is punctured, and the indication information may occupy the resources of the punctured URLLC data, such that the indication information is carried along with the URLLC data on the URLLC control channel. In another implementation, the base station may send the indication information and the URLLC data separately on the URLLC control channel, i.e., indicating that the information is not multiplexed with the URLLC data.

In S402, the base station sends configuration information for the terminal on the eMBB control channel.

The configuration information may be carried in a RRC signaling or a MAC signaling, for controlling, including but not limited to, data transmission of the terminal, measurement control and reporting, handover, cell selection and reselection, HARQ and the like.

In S403, the terminal receives the indication information on the URLLC control channel and monitors the eMBB control channel according to the indication information.

Specifically, after receiving the indication information, the terminal may detect the eMBB control channel from the preconfigured control channel search spaces or CORESETs, and monitors the eMBB control channel according to the timing instance in the indication information.

In S404, the terminal detects DCI on the eMBB control channel and decodes the configuration information on the eMBB control channel according to the detected DCI.

Figure 5:
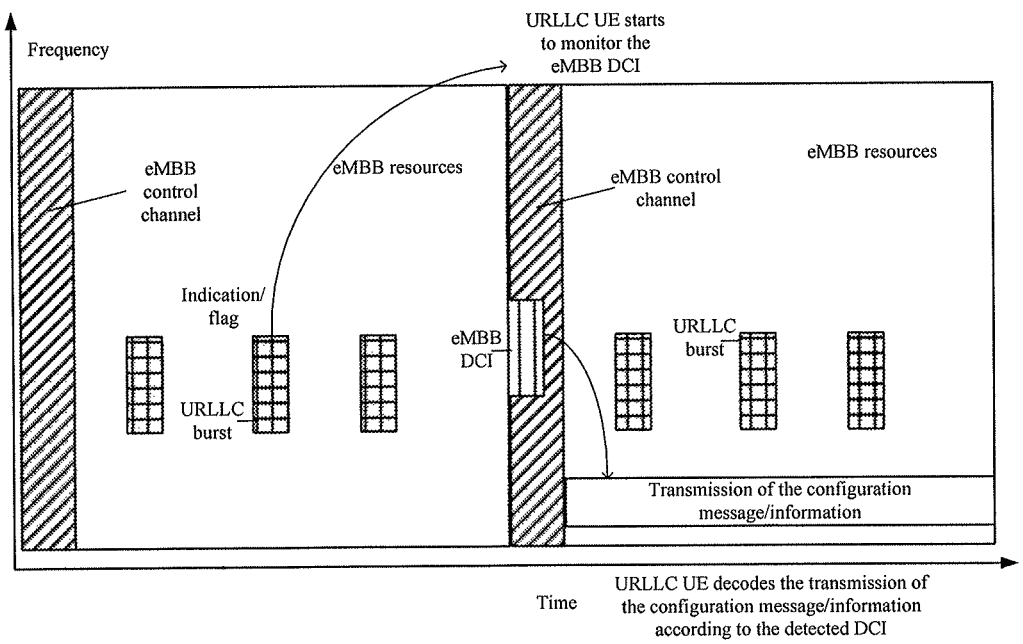
FIG. 5 is a schematic diagram of the implementation of the first example in FIG. 4 according to an embodiment of the disclosure.

FIG. 5 illustrates the above implementation of the information transmission method according to the example 1 of the disclosure. It should be understood that the two resource blocks in FIG. 5 may or may not be consecutive, which will not be limited in the embodiment of the disclosure. As illustrated in FIG. 5, the base station sends the indication information (or a flag) on the URLLC control channel for triggering the terminal to monitor the eMBB control channel, wherein the indication information comprises a timing instance at which a terminal monitors the eMBB control channel. Upon receiving the indication information, the terminal may start to monitor the eMBB control channel according to the timing instance and demodulate the configuration information according the DCI of the eMBB control channel.

It should be understood that the operation in S403 may be prior to the operation in S402. In this case, the base station sends the configuration information after the terminal monitors the eMBB control channel according to the indication information, such that the terminal cannot detect the configuration information on the eMBB control channel, and the process ends. In an alternative embodiment, the terminal may preset a time period. If no eMBB control channel carrying the configuration information is detected within the time period, it indicates that the operation in S402 has not been occurred, and the process ends.

According to the information transmission method of Example 1 of the disclosure, upon receiving the indication information on the URLLC control channel, the terminal may obtain, from the indication information, information associated with an eMBB control channel and a timing instance at which a terminal monitors the eMBB control channel, thereby avoiding the high power consumption caused by the continuous monitoring of the terminal and reducing the impacts on performance of the other terminals.

Example 2

Figure 6:
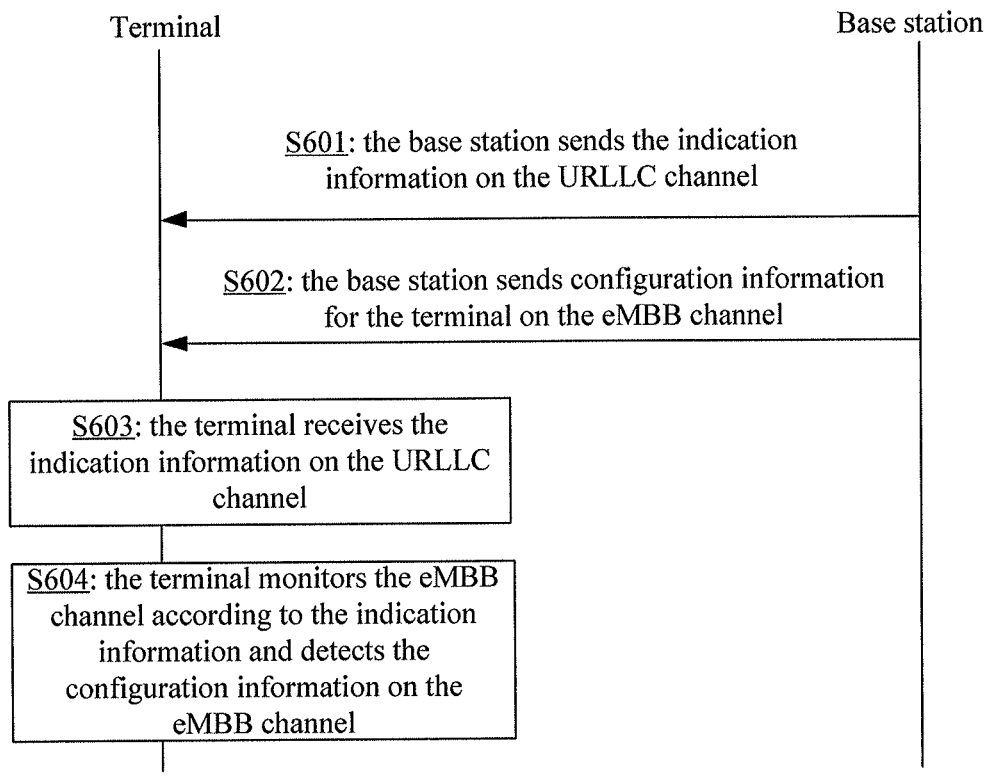
FIG. 6 is a schematic flowchart of a second example according to an embodiment of the disclosure.

In this example, the base station will send configuration information to the UE in the active state of the URLLC service, i.e., the UE is monitoring to receive URLLC data. In the scenario of this example, the first channel may be a channel carrying the URLLC service, while the second channel may be a channel carrying the eMBB service. It should be noted that the above scenario is only meant to illustrate the disclosure and not to restrict it in any way. Referring to FIG. 6, the flowchart of the example is illustrated as follows.

In S601, the base station sends the indication information on the URLLC channel.

The indication information comprises information associated with an eMBB channel and a timing instance at which a terminal monitors the eMBB channel, wherein the information associated with the eMBB channel comprises at least one of one or more control channel search spaces or CORESETs corresponding to the eMBB channel, time-domain resources of the eMBB channel, or frequency-domain resources of the eMBB channel. The timing instance in the indication information may be a specific time at which the terminal starts to monitor the second channel, or a time window during which the terminal monitors the second channel.

Additionally, the indication information further comprises information for sending the configuration information, which may specifically comprise at least one of the following: time-domain resources used for sending the configuration information, frequency-domain resources used for sending the configuration information, modulation manner used for sending the configuration information, or channel coding manner used for sending the configuration information.

In an implementation of this operation, the indication information may be carried along with URLLC data on the URLLC channel by multiplexing the indication information with the URLLC data. In an alternative implementation, the indication information is carried along with URLLC data on the URLLC channel by puncturing a portion of the URLLC data. Specifically, a portion of the URLLC data is punctured, and the indication information may occupy the resources of the punctured URLLC data, such that the indication information is carried along with the URLLC data on the URLLC channel. In another implementation, the base station may send the indication information and the URLLC data separately on the URLLC channel, i.e., indicating that the information is not multiplexed with the URLLC data.

In S602, the base station sends configuration information for the terminal on the eMBB channel.

The configuration information may be carried in a RRC signaling or a MAC signaling, for controlling, including but not limited to, data transmission of the terminal, measurement control and reporting, handover, cell selection and reselection, HARQ and the like.

In S603, the terminal receives the indication information on the URLLC channel.

In S604, the terminal monitors the eMBB channel according to the indication information and detects the configuration information on the eMBB channel.

Figure 7:
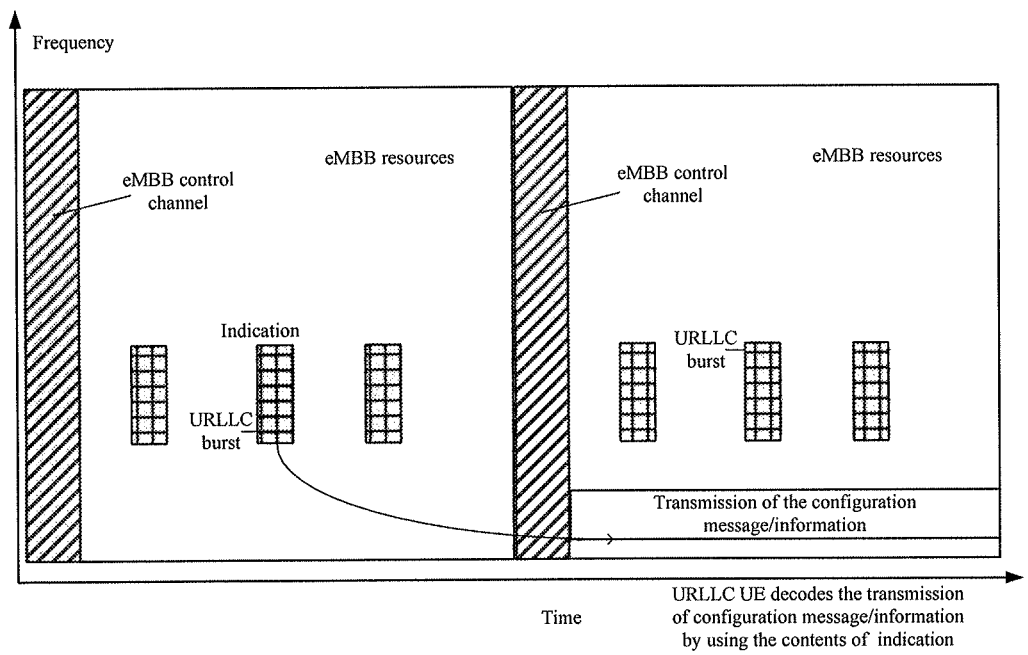
FIG. 7 is a schematic diagram of the implementation of the second example in FIG. 6 according to an embodiment of the disclosure.

The implementations in S604 are different as the different contents of the indication information, which are specifically illustrated in FIG. 7 and FIG. 8.

As illustrated in FIG. 7, when the indication information further comprises information for sending the configuration information, i.e., at least one of time-domain resources, frequency-domain resources, modulation manner or channel coding manner used for sending the configuration information, after receiving the indication information, the terminal may detect the eMBB channel according to at least one of time-domain resources, frequency-domain resources, modulation manner or channel coding manner used for sending the configuration information in the indication information and decode the configuration information carried in the eMBB channel.

It should be noted that in the above implementation, there is no need to detect the DCI of the eMBB channel, and the configuration information may be decoded merely according to the indication information.

Figure 8A:
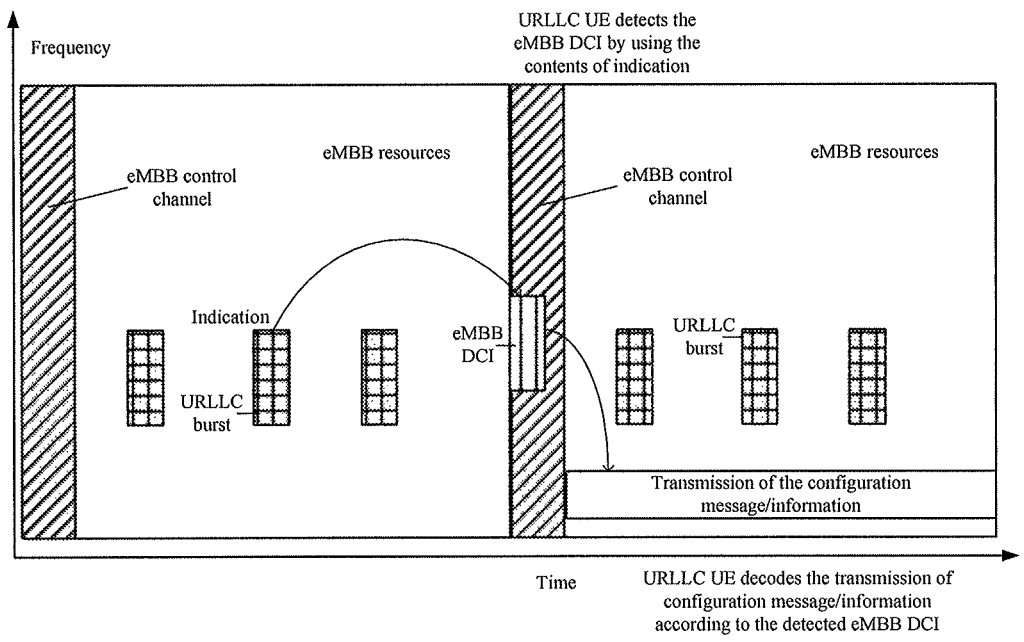
FIG. 8A to FIG. 8C are schematic diagrams of another implementation of the second example in FIG. 6 according to an embodiment of the disclosure.
Figure 8B:
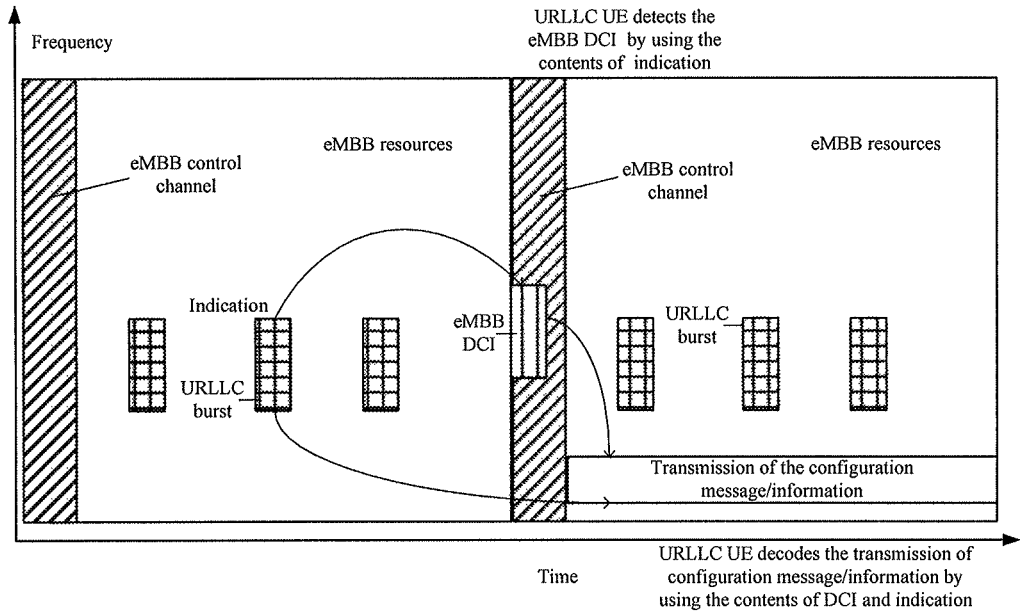
Figure 8C:
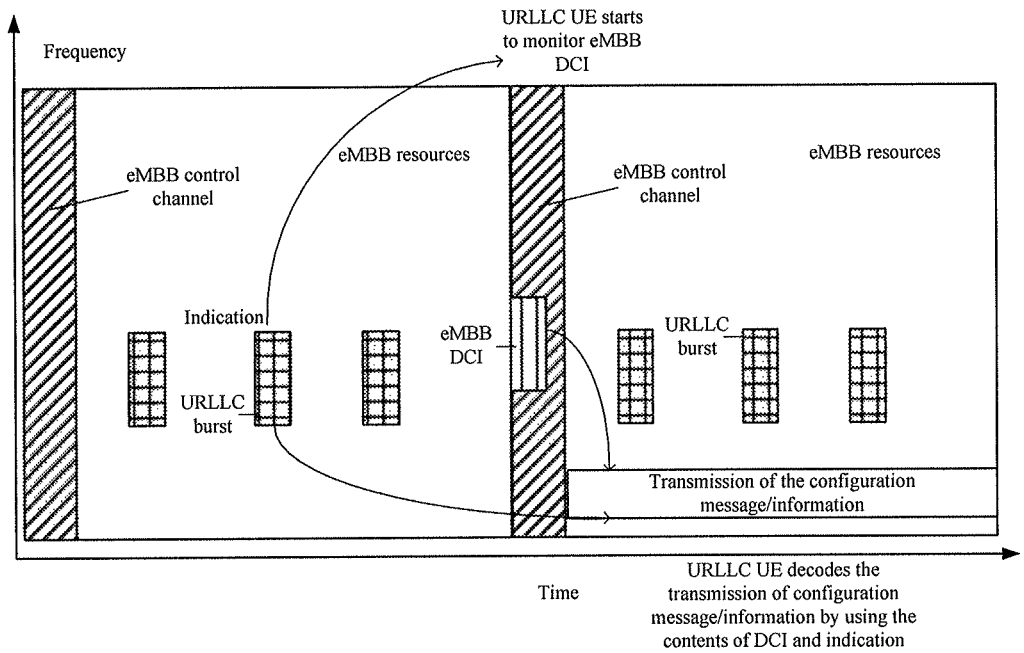

When the indication information comprises one or more control channel search spaces or CORESETs corresponding to the second channel, the implementation in S604 is illustrated in FIG. 8A to FIG. 8C. Specifically, after receiving the indication information, the terminal may detect the eMBB control channel from the control channel search spaces or CORESETs in the indication information, detect the DCI carried in the eMBB control channel according to the timing instance, and decode the configuration information according to the indication information and the detected DCI.

In an alternative embodiment, the terminal may preset a time period. If no eMBB control channel carrying the configuration information is detected within the time period, it indicates that the operation in S602 has not been occurred, and the process ends.

It should be noted that in the above implementation, the control channel search spaces or CORESETs corresponding to the eMBB control channel are obtained from the indication information, and the DCI carried in the eMBB control channel needs to be detected. The configuration information may be decoded based on the indication information in combination with the detected DCI.

According to the information transmission method of Example 2 of the disclosure, upon receiving the indication information on the URLLC channel, the terminal may obtain, from the indication information, information associated with an eMBB channel and a timing instance at which a terminal monitors the eMBB channel, thereby avoiding the high power consumption caused by the continuous monitoring of the terminal and reducing the impacts performance of on the other terminals.

Embodiment 4

Figure 9:
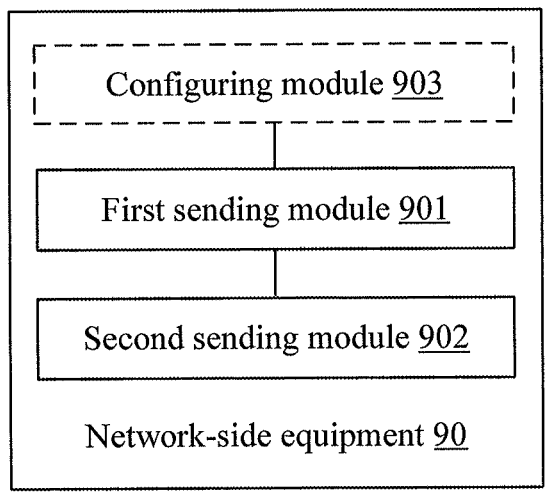
FIG. 9 is a schematic structure diagram of network-side equipment according to an embodiment of the disclosure.

Based on the same inventive concept as the previous embodiment, FIG. 9 illustrates network-side equipment 90 according to an embodiment of the disclosure. The network-side equipment 90 may be a gNB in the 5G NR, and include a first sending module 901 and a second sending module 902.

The first sending module 901 is configured to send indication information on a first channel for performing a first service, the indication information comprising at least one of information associated with a second channel or a timing instance at which a terminal monitors the second channel, the second channel being used for performing a second service.

The second sending module 902 is configured to send configuration information for the terminal on the second channel.

The first channel may comprise a data channel or a control channel for the first service, the second channel may comprise a data channel or a control channel for the second service, and the first service may have a higher priority than the second service. In an example, the first service may comprise URLLC service, and the second service may comprise other service other than the URLLC service, such as the eMBB service. Correspondingly, the first channel may be a data channel or a control channel carrying the URLLC service, and the second channel may be a data channel or a control channel carrying the eMBB service.

In an example, the information associated with the second channel comprises at least one of one or more control channel search spaces or CORESETs corresponding to the second channel, time-domain resources of the second channel, or frequency-domain resources of the second channel.

In an example, the first sending module 901 may multiplex the indication information with service data of the first service to allow the indication information be carried along with the service data on the first channel. In an alternative example, the first sending module 901 may puncture a portion of service data of the first service to allow the indication information be carried along with the service data of the first service on the first channel. Specifically, a portion of the service data of the first service is punctured, and the indication information may occupy the resources of the punctured service data, such that the indication information is carried along with service data of the first service on the first channel. In another example, the first sending module 901 may send the indication information and the service data of the first service separately on the first channel, i.e., indicating that the information is not multiplexed with the service data of the first service.

The configuration information may be carried in a RRC signaling or a MAC signaling, for controlling, including but not limited to, data transmission of the terminal, measurement control and reporting, handover, cell selection and reselection, HARQ and the like. It should be understood that in addition to the configuration information, the above transmission method can be applied for transmitting other information/messages.

In an alternative implementation, the network-side equipment 90 may further comprises a configuring module 903 for configuring one or more control channel search spaces or a CORESETs specified in the 5G NR technology. In this case, after receiving the indication information from the base station, the terminal may detect the second channel from the configured control channel search spaces or CORESETs. It should be noted that the control channel search spaces or CORESETs may be configured before or after the indication information is sent.

In an alternative implementation, the indication information may further comprise information for sending the configuration information. The information for sending the configuration information may comprise at least one of the following: time-domain resources used for sending the configuration information, frequency-domain resources used for sending the configuration information, modulation manner used for sending the configuration information, or channel coding manner used for sending the configuration information. In this case, the network-side equipment 90 may send the indication information containing the above information, such that the terminal may obtain the second channel information based on at least one of time-domain resources, frequency-domain resources, modulation manner, or channel coding manner used for sending the configuration information in the indication information, or detect the second channel from the control channel search spaces or CORESETs in the indication information, and then detect the configuration information on the second channel.

In the embodiment of the disclosure, the first channel may be a channel carrying the URLLC service, and the second channel may be a channel carrying the eMBB service. Specially, the solution may be implemented as follows. The first sending module 901 in the network-side equipment 90 may send the indication information on the URLLC channel (or URLLC resources), the indication information comprising information associated with an eMBB channel (or eMBB resources) and/or a timing instance at which a terminal monitors the eMBB channel, and then send configuration information for the terminal on the eMBB channel. After receiving the indication information from the base station, according to information provided by the indication information, the terminal may monitor the eMBB channel and detect the configuration information carried in the eMBB channel. The indication information may or may not be multiplexed with URLLC data. If the indication information is not multiplexed with URLLC data, the indication information is merely transmitted in URLLC resources together with URLLC data. Obviously, the solution can avoid the high power consumption caused by the continuous monitoring of the terminal; and further through sending the configuration information on the eMBB resources with a lower latency requirement, the solution can prevent the current terminal from preempting the resources of the other terminals and thus reduce the impacts on performance of the other terminals.

In the embodiment of the disclosure, terms "module", "system" and the like used in the specification may be a circuit, a processor, a subroutine program, a software program and the like, which may be implemented in hardware or in the form of software function modules.

In addition, each module in each embodiment of the disclosure may be integrated into a processing unit, each unit may also exist independently, and two or more than two units may also be integrated into a unit. The above integrated units may be implemented in hardware or in the form of software function modules.

When being implemented in form of software function units and sold or used as an independent product, the function may also be stored in a computer-readable storage medium. Based on such an understanding, the technical solutions of the disclosure substantially or parts making contributions to a related art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read Only Memory (ROM), a Random Access Memory (RAM), a magnetic disk or an optical disk.

The embodiment of the disclosure provides a computer-readable storage medium having stored thereon instructions for information transmission that, when executed by at least one processor, cause the processor to execute the method according to Embodiment 1 of the disclosure. The description about the computer-readable storage medium may make reference to the description of Embodiment 1 of the disclosure, which will not be elaborated herein to avoid repetition.

Figure 10:
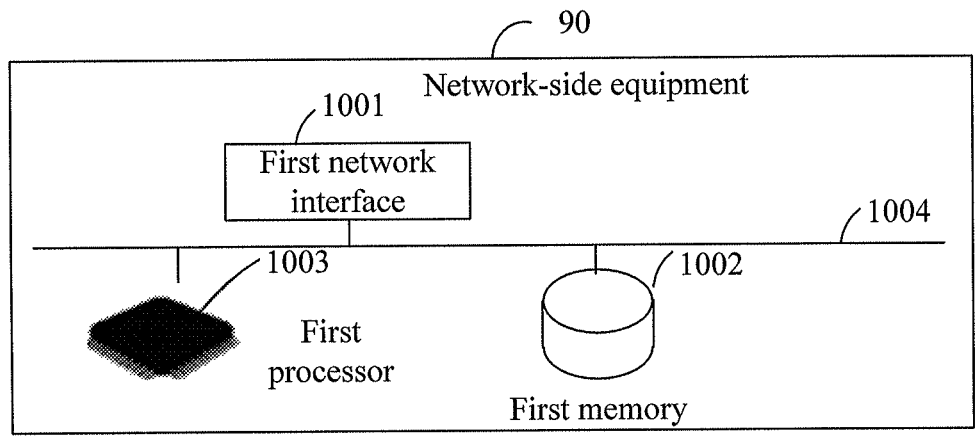
FIG. 10 is a schematic structure diagram of hardware components of network-side equipment according to an embodiment of the disclosure.

On the basis of the network-side equipment 90 and the computer-readable storage medium, FIG. 10 illustrates a structure diagram of hardware components of the network-side equipment 90 according to an embodiment of the disclosure. The network-side equipment 90 may include a first network interface 1001, a first memory 1002 and a first processor 1003, wherein all components are coupled together via a bus system 1004. The bus system 1004 is configured for connecting the components in communication. In addition to a data bus, the bus system 1004 may include a power bus, a control bus and a state signal bus. For clarity, various buses in FIG. 10 are denoted as the bus system 1004.

The first network interface 1001 is configured to receive and send signals during a process of sending and receiving information with other external network elements.

The first memory 1002 is configured to store computer programs running on the first processor 1003.

The first processor 1003 is configured to execute the operations when executing the computer programs: sending indication information on a first channel for performing a first service, the indication information comprising at least one of information associated with a second channel or a timing instance at which a terminal monitors the second channel, the second channel being used for performing a second service; and sending configuration information for the terminal on the second channel.

It can be understood that the first memory 1002 in the embodiment of the disclosure may be a volatile memory or a nonvolatile memory, or may include both the volatile and nonvolatile memories, wherein the nonvolatile memory may be a ROM, a PROM (Programmable ROM), an Erasable PROM (EPROM), an EEPROM (Electrically Erasable PROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

The first processor 1003 may be an integrated circuit chip with a signal processing capability. In an implementation process, each operation of the method embodiments may be completed by an integrated logical circuit of hardware in the first processor 1003 or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor.

It should be understood that the embodiments described herein may be implemented in hardware, software, firmware, middleware, microcode, or a combination thereof. For the hardware implementation, the processing unit may be implemented in one or more ASICs, DSPs, programmable logic devices (PLDs), FPGA, a general purpose processor, or other electronic units or combination for performing the present application. For software implementations, the solution described herein may be implemented by the modules (e.g., processes, functions and the like) with the functions described herein.

Embodiment 5

Figure 11:
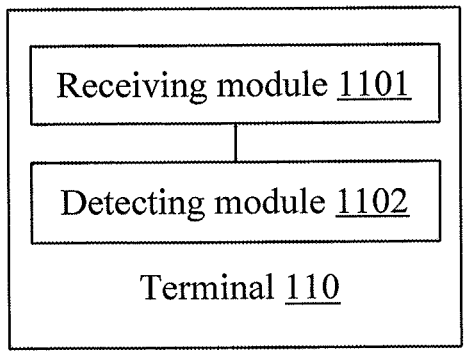
FIG. 11 is a first schematic structure diagram of a terminal according to an embodiment of the disclosure.

Based on the same inventive concept as the previous embodiment, FIG. 11 illustrates a terminal 110 according to an embodiment of the disclosure. The terminal 110 may include a receiving module 1101 and a detecting module 1102.

The receiving module 1101 is configured to receive indication information sent by a base station on a first channel, the indication information comprising at least one of information associated with a second channel or a timing instance at which a terminal monitors the second channel, the first channel being used for performing a first service and the second channel being used for performing a second service.

The detecting module 1102 is configured to monitor the second channel and detect configuration information sent by the base station on the second channel according to the indication information.

In the embodiment of the disclosure, the first channel may comprise a data channel or a control channel for the first service, the second channel may comprise a data channel or a control channel for the second service, and the first service may have a higher priority than the second service. In an example, the first service may comprise URLLC service, and the second service may comprise other service other than the URLLC service, such as the eMBB service. Correspondingly, the first channel may be a data channel or a control channel carrying the URLLC service, and the second channel may be a data channel or a control channel carrying the eMBB service.

In an example, the information associated with the second channel comprises at least one of one or more control channel search spaces or CORESETs corresponding to the second channel, time-domain resources of the second channel, or frequency-domain resources of the second channel.

Figure 12A:
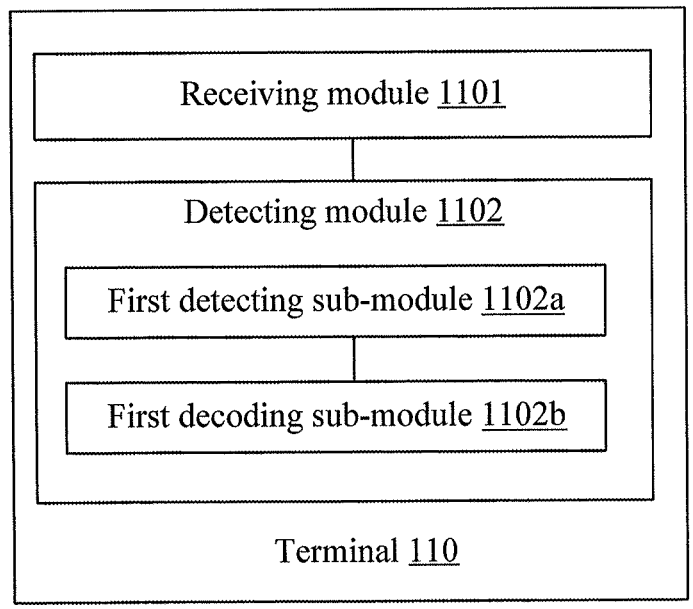
FIG. 12A is a second schematic structure diagram of a terminal according to an embodiment of the disclosure.

In one implementation of the embodiment of the disclosure, as illustrated in FIG. 12A, the detecting module 1102 comprises a first detecting sub-module 1102a and a first decoding sub-module 1102b.

The first detecting sub-module 1102a is configured to receive the indication information from the receiving module 1101, detect the second channel from one or more control channel search spaces or CORESETs preconfigured by the base station, detect DCI carried in the second channel according to the timing instance, and sent the detected DCI to the first decoding sub-module 1102b.

The first decoding sub-module 1102b is configured to decode the configuration information according to the detected DCI received from the first detecting sub-module 1102a.

In one alternative implementation of the embodiment of the disclosure, the indication information may further comprise information for sending the configuration information, which may specifically comprise at least one of the following: time-domain resources, frequency-domain resources, modulation manner, or channel coding manner used for sending the configuration information.

In this case, in an example, the detecting module 1102 may be further configured to decode the configuration information according to at least one of time-domain resources, frequency-domain resources, modulation manner or channel coding manner used for sending the configuration information in the indication information after receiving the indication information.

Figure 12B:
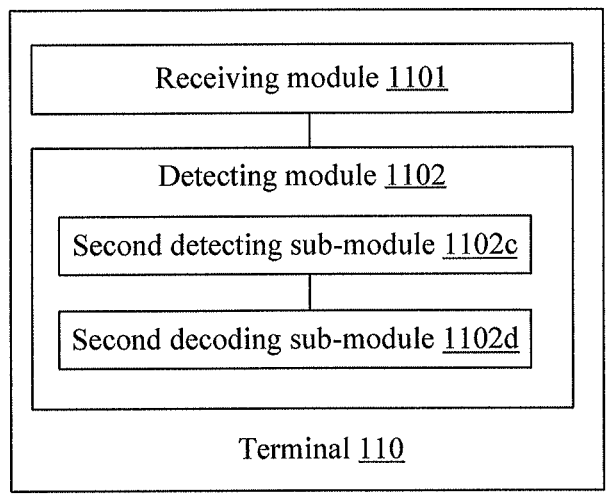
FIG. 12B is a third schematic structure diagram of a terminal according to an embodiment of the disclosure.

In an alternative example, as illustrated in FIG. 12B, the detecting module 1102 may comprise a second detecting sub-module 1102c and a second decoding sub-module 1102d. The second detecting sub-module 1102c is configured to receive the indication information from the receiving module 1101, detect the second channel from the control channel search spaces or CORESETs corresponding to the second channel in the indication information, detect DCI carried in the second channel according to the timing instance, and sent the detected DCI to the second decoding sub-module 1102d. The second decoding sub-module 1102d is configured to decode the configuration information according to the indication information and the detected DCI received from the second detecting sub-module 1102c.

In an implementation of the embodiment of the disclosure, the indication information may be carried along with service data of the first service on the first channel by multiplexing the indication information with the service data. In an alternative implementation, the indication information is carried along with service data of the first service on the first channel by puncturing a portion of the service data. Specifically, a portion of the service data of the first service is punctured, and the indication information may occupy the resources of the punctured service data, such that the indication information is carried along with service data of the first service on the first channel. In another implementation of the embodiment of the disclosure, the indication information and the service data of the first service are received separately on the first channel, i.e., indicating that the information is not multiplexed with the service data of the first service.

The configuration information may be carried in a RRC signaling or a MAC signaling, for controlling, including but not limited to, data transmission of the terminal, measurement control and reporting, handover, cell selection and reselection, HARQ and the like.

In the embodiment of the disclosure, alternatively, the first channel may be a channel carrying the URLLC service (i.e., an URLLC channel), and the second channel may be a channel carrying the eMBB service (i.e., an eMBB channel). Specially, the solution may be implemented as follows. The receiving module 1101 in the terminal 110 may receive the indication information sent by the network-side equipment 90 on the URLLC channel (or URLLC resources), the indication information comprising information associated with an eMBB channel (or eMBB resources) and/or a timing instance at which a terminal monitors the eMBB channel, detect the eMBB channel according to information provided by the indication information and obtain the configuration information on the eMBB channel. The indication information may or may not be multiplexed with URLLC data. If the indication information is not multiplexed with URLLC data, the indication information is merely transmitted in URLLC resources together with URLLC data. Obviously, the solution can avoid the high power consumption caused by the continuous monitoring of the terminal; and further through sending the configuration information on the eMBB resources with a lower latency requirement, the solution can prevent the current terminal from preempting the resources of the other terminals and reduce the impacts on performance of the other terminals.

In the embodiment of the disclosure, terms "module", "sub-module", "system" and the like used in the specification may be a circuit, a processor, a subroutine program, a software program and the like, which may be implemented in hardware or in the form of software function modules.

In addition, each module in each embodiment of the disclosure may be integrated into a processing unit, each unit may also exist independently, and two or more than two units may also be integrated into a unit. The above integrated units may be implemented in hardware or in the form of software function modules.

When being implemented in form of software function units and sold or used as an independent product, the function may also be stored in a computer-readable storage medium. Based on such an understanding, the technical solutions of the disclosure substantially or parts making contributions to a related art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read Only Memory (ROM), a Random Access Memory (RAM), a magnetic disk or an optical disk.

The embodiment of the disclosure provides a computer-readable storage medium having stored thereon instructions for information transmission that, when executed by at least one processor, cause the processor to execute the method according to Embodiment 2 of the disclosure. The description about the computer-readable storage medium may make reference to the description of Embodiment 2 of the disclosure, which will not be elaborated herein to avoid repetition.

Figure 13:
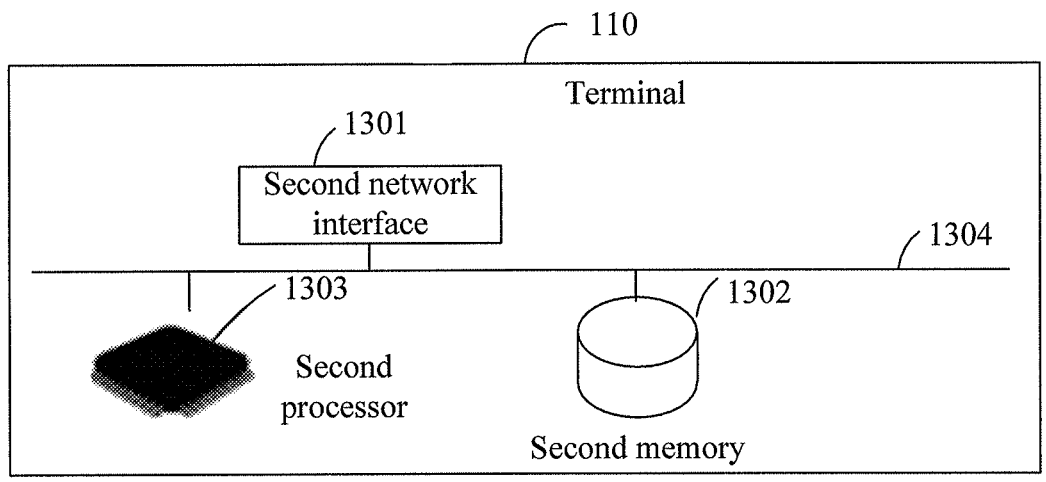
FIG. 13 is a schematic structure diagram of hardware components of a terminal according to an embodiment of the disclosure.

On the basis of the terminal 110 and the computer-readable storage medium, FIG. 13 illustrates a structure diagram of hardware components of the terminal 110 according to an embodiment of the disclosure. The terminal 110 may include a second network interface 1301, a second memory 1302 and a second processor 1303, wherein all components are coupled together via a bus system 1304. The bus system 1304 is configured for connecting the components in communication. In addition to a data bus, the bus system 1304 may include a power bus, a control bus and a state signal bus. For clarity, various buses in FIG. 13 are denoted as the bus system 1304.

The second network interface 1301 is configured to receive and send signals during a process of sending and receiving information with other external network elements.

The second memory 1302 is configured to store computer programs running on the second processor 1303.

The second processor 1303 is configured to execute the operations when executing the computer programs: receiving indication information sent by a base station on a first channel, the indication information comprising at least one of information associated with a second channel or a timing instance at which a terminal monitors the second channel, the first channel being used for performing a first service and the second channel being used for performing a second service; and monitoring the second channel and detecting configuration information sent by the base station on the second channel according to the indication information.

In the embodiment of the disclosure, the hardware components of terminal 100 are similar to the components described in Embodiment 4 of the disclosure, which will not be elaborated herein to avoid repetition.

Embodiment 6

Figure 14:
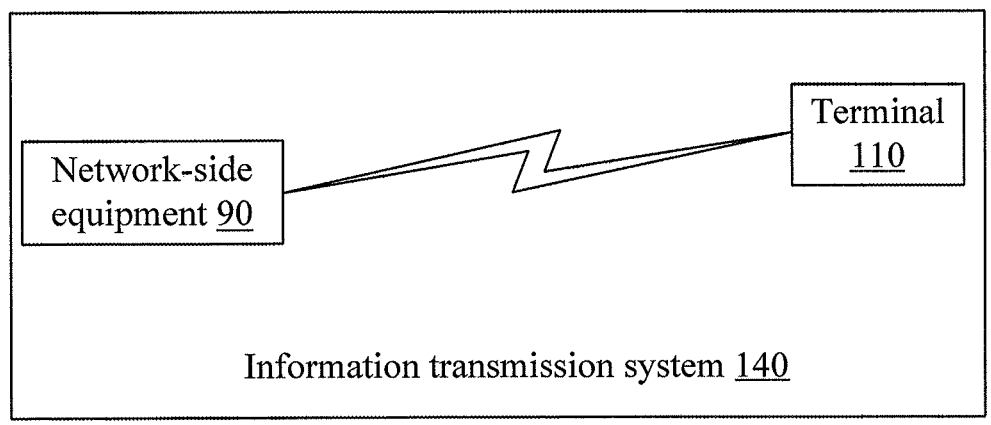
FIG. 14 is a schematic structure diagram of an information transmission system according to an embodiment of the disclosure.

Based on the same inventive concept as the previous embodiment, FIG. 14 is a schematic structure diagram of an information transmission system 140 according to an embodiment of the disclosure. The system 140 may include network-side equipment 90 and a terminal 110.

The network-side equipment 90 is configured to send indication information on a first channel for performing a first service, the indication information comprising at least one of information associated with a second channel or a timing instance at which a terminal monitors the second channel, the second channel being used for performing a second service, and send configuration information for the terminal 110 on the second channel.

The terminal 110 is configured to receive indication information sent by the network-side equipment 90 on the first channel, monitor the second channel and detect configuration information sent by the network-side equipment 90 on the second channel.

In specific implementation process, the network-side equipment 90 in the disclosure may preferably be the network-side equipment or the base station described in each embodiment of the disclosure, and the terminal 110 may preferably be the terminal described in each embodiment of the disclosure.

Those skilled in the art should understand that the embodiments of the disclosure may be provided as a method, a system, or a computer program product. Accordingly, the disclosure may adopt hardware embodiments, software embodiments, or embodiments combining software and hardware. The disclosure may further take the form of a computer program product executed on one or more computer readable storage media (including but not limited to, magnetic disk memory and optical memory) containing computer program codes.

The disclosure is described with reference to a flowchart and/or block diagram of a method, equipment (system), and a computer program product according to embodiments of the disclosure. It should be understood that each operation and/or block in the flowcharts and/or block diagrams, and combinations of the operations and/or blocks in the flowcharts and/or the block diagrams, may be implemented by computer program instructions. In an embodiment of the disclosure, the one or more operations may constitute computer-readable instructions stored on one or more computer-readable media that, when executed by an electronic device, cause the electronic device to execute the described operations. The order in which some or all of the operations are described should not be construed to imply that the operations must be executed orderly. Those skilled in the art will understand an alternative order with the benefit described in the specification. Moreover, it should be understood that not all operations need to be present in each embodiment provided herein.

The above are only the preferred embodiments of the disclosure and not intended to limit the scope of protection of the disclosure. Any modifications, equivalent substitutions and improvements made within the spirit and principle of the disclosure are deemed to be included within the scope of protection of the disclosure.

INDUSTRIAL APPLICABLITY

In the embodiments of the disclosure, the network-side equipment may send the indication information on the first channel for performing a first service, such that the terminal may monitor the second channel and detect the information carried on the second channel according to the information provided by the indication information, thereby avoiding the high power consumption caused by the continuous monitoring of the terminal and reducing the impacts on performance of the other terminals.

What is claimed is:

1. An information transmission method, comprising:
receiving, by a terminal, indication information sent by a base station on a first channel, wherein the indication information comprises at least one of information associated with a second channel or a timing instance at which a terminal monitors the second channel, the first channel being used for performing a first service and the second channel being used for performing a second service; and
monitoring, by the terminal, the second channel and detecting configuration information sent by the base station on the second channel according to the indication information;
wherein the first service has a higher priority than the second service, and the first service comprises Ultra Reliable and Low Latency Communication (URLLC) service, and the second service comprises Enhance Mobile Broadband (eMBB) service.

2. The method according to claim 1, wherein the first channel comprises a data channel or a control channel for the first service, and the second channel comprises a data channel or a control channel for the second service.

3. The method according to claim 1, wherein the information associated with the second channel comprises at least one of the following: one or more control channel search spaces or Control Resource Sets (CORESETs) corresponding to the second channel, time-domain resources of the second channel, or frequency-domain resources of the second channel.

4. The method according to claim 3, wherein the step of monitoring the second channel and detecting configuration information sent by the base station on the second channel according to the indication information comprises:
   after receiving the indication information, detecting, by the terminal, the second channel from the one or more control channel search spaces or CORESETs corresponding to the second channel in the indication information;
   detecting downlink control information (DCI) carried in the second channel according to the timing instance in the indication information; and
   decoding the configuration information according to the indication information and the detected DCI.

5. The method according to claim 1, wherein the step of monitoring the second channel and detecting configuration information sent by the base station on the second channel according to the indication information comprises:
   after receiving the indication information, detecting, by the terminal, the second channel from one or more control channel search spaces or CORESETs preconfigured by the base station;
   detecting downlink control information (DCI) carried in the second channel according to the timing instance in the indication information; and
   decoding the configuration information according to the detected DCI.

6. The method according to claim 1, wherein the indication information further comprises information for sending the configuration information, and
   the information for sending the configuration information comprises at least one of the following: time-domain resources, frequency-domain resources, modulation manner, or channel coding manner used for sending the configuration information;
   wherein the step of monitoring the second channel and detecting configuration information sent by the base station on the second control channel according to the indication information comprises:
   after receiving the indication information, decoding, by the terminal, the configuration information according to at least one of time-domain resources, frequency-domain resources, modulation manner or channel coding manner used for sending the configuration information in the indication information.

7. The method according to claim 1, wherein the indication information is carried along with service data of the first service on the first channel by puncturing a portion of the service data.

8. A terminal, comprising: a network interface, a memory and a processor, wherein the network interface is configured to receive and send signals during a process of sending and receiving information with other external network elements;
the memory is configured to store computer programs running on the processor; and
the processor is configured to: receive indication information sent by a base station on a first channel through the network interface, wherein the indication information comprises at least one of information associated with a second channel or a timing instance at which a terminal monitors the second channel, the first channel being used for performing a first service, and the second channel being used for performing a second service; and monitor the second channel and detect configuration information sent by the base station on the second channel according to the indication information;
wherein the first service has a higher priority than the second service, and the first service comprises Ultra Reliable and Low Latency Communication (URLLC) service, and the second service comprises Enhance Mobile Broadband (eMBB) service.

9. The terminal according to claim 8, wherein the first channel comprises a data channel or a control channel for the first service, and the second channel comprises a data channel or a control channel for the second service.

10. The terminal according to claim 8, wherein the information associated with the second channel comprises at least one of the following: one or more control channel search spaces or Control Resource Sets (CORESETs) corresponding to the second channel, time-domain resources of the second channel, or frequency-domain resources of the second channel.

11. The terminal according to claim 10, wherein the processor is further configured to detect the second channel from the one or more control channel search spaces or CORESETs corresponding to the second channel in the indication information, detect DCI carried in the second control channel according to the timing instance in the indication information; and
   decode the configuration information according to the indication information and the detected DCI.

12. The terminal according to claim 8, wherein the processor is further configured to detect the second channel from one or more control channel search spaces or CORESETs preconfigured by the base station, detect downlink control information (DCI) carried in the second channel according to the timing instance in the indication information; and
   decode the configuration information according to the detected DCI.

13. The terminal according to claim 8, wherein the indication information further comprises information for sending the configuration information.

14. The terminal according to claim 13, wherein the information for sending the configuration information comprises at least one of the following: time-domain resources, frequency-domain resources, modulation manner, or channel coding manner used for sending the configuration information.

15. The terminal according to claim 14, wherein the processor is further configured to: decode the configuration information according to at least one of time-domain resources, frequency-domain resources, modulation manner or channel coding manner used for sending the configuration information in the indication information after receiving the indication information.

16. The terminal according to claim 8, wherein the indication information is carried along with service data of the first service on the first channel by puncturing a portion of the service data.

* * * * *